United States Patent
Ebrahimi et al.

(10) Patent No.: US 8,156,159 B2
(45) Date of Patent: Apr. 10, 2012

(54) DATA MASKING AND UNMASKING OF SENSITIVE DATA

(75) Inventors: Fariborz Ebrahimi, Basking Ridge, NJ (US); Walid Hassan, Irving, TX (US); Sumit Singh, Irving, TX (US); Swamynathan Kuppuswamy, Irving, TX (US); Kannan Thillai Chidambaram, Irving, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 317 days.

(21) Appl. No.: 12/625,229

(22) Filed: Nov. 24, 2009

(65) Prior Publication Data

US 2010/0205189 A1  Aug. 12, 2010

Related U.S. Application Data

(60) Provisional application No. 61/151,728, filed on Feb. 11, 2009.

(51) Int. Cl.
*G06F 17/30* (2006.01)

(52) U.S. Cl. ........ 707/804; 707/802; 707/803; 707/805; 707/806; 707/807; 709/201; 709/238; 709/226; 709/230; 709/203

(58) Field of Classification Search .......... 707/602, 707/802–811; 709/201, 203, 238, 226, 230
See application file for complete search history.

(56) References Cited

U.S. PATENT DOCUMENTS

| | | | | |
|---|---|---|---|---|
| 5,014,219 A * | 5/1991 | White | ............................. | 706/25 |
| 6,647,053 B1 * | 11/2003 | Garces | ........................ | 375/132 |
| 6,742,034 B1 * | 5/2004 | Schubert et al. | ............. | 709/226 |
| 6,968,390 B1 * | 11/2005 | Chavez, Jr. | .................... | 709/238 |
| 7,228,503 B1 * | 6/2007 | Wang et al. | ..................... | 715/736 |
| 7,400,591 B2 * | 7/2008 | Brawn et al. | ................... | 370/254 |
| 7,581,014 B2 * | 8/2009 | Mittig et al. | ..................... | 709/230 |
| 2005/0038898 A1 * | 2/2005 | Mittig et al. | ................... | 709/230 |
| 2006/0004956 A1 * | 1/2006 | Madajczak | .................... | 711/108 |
| 2006/0088772 A1 * | 4/2006 | Zhang | ............................... | 430/5 |
| 2007/0016637 A1 * | 1/2007 | Brawn et al. | ................... | 709/200 |
| 2008/0002836 A1 * | 1/2008 | Moeller et al. | ................ | 381/73.1 |
| 2009/0116659 A1 * | 5/2009 | Moeller et al. | ................ | 381/73.1 |
| 2009/0170477 A1 * | 7/2009 | Bensimon et al. | ............. | 455/411 |
| 2010/0037298 A1 * | 2/2010 | Lottin et al. | ....................... | 726/4 |
| 2010/0135323 A1 * | 6/2010 | Leong | ............................ | 370/474 |

OTHER PUBLICATIONS

"Data masking", Wikipedia, the free encyclopedia http://en.wikipedia.org/wiki/Data_masking 1 page, Sep. 13, 2009.

* cited by examiner

*Primary Examiner* — Frantz Coby

(57) ABSTRACT

A server is configured to receive an input file or table that includes a number of data elements, where the data elements include some sensitive data elements of different types; identify each of the different types of sensitive data elements; identify a subset of the sensitive data elements that corresponds to each of the different types of sensitive data elements; simultaneously perform data masking operations on the sensitive data elements to create masked sensitive data elements, where a separate one of the data masking operations is performed on each of the subsets of the sensitive data elements; generate an output file or table that includes the data elements from the input file or table, where the sensitive data elements, of the input file or table, are replaced with the masked sensitive data elements; and output or store the output file or table.

20 Claims, 10 Drawing Sheets

FIG. 6

| CK | | CM |
|---|---|---|
| MASK TYPE<br>START POSITION<br>END POSITION | ● ● ● | MASK TYPE<br>START POSITION<br>END POSITION |

METADATA TABLE

800

| SENSITIVE DATA ELEMENT | MASKING OPERATION |
|---|---|
| SSN/TAXPAYER ID/ NATIONAL ID | TRANSLATE |
| NAME | SWAP |
| TELEPHONE NUMBER | SWAP OR TRANSLATE |
| BANK ACCOUNT | SWAP |
| ADDRESS | SWAP |
| DRIVER'S LICENSE NUMBER | SWAP OR TRANSLATE |
| COMMENTS | BLANK OUT WITH DUMMY TEXT |

FIG. 8

DATA MASKING AND UNMASKING OF SENSITIVE DATA

RELATED APPLICATION

This application claims priority to U.S. Provisional Application No. 61/151,728, filed Feb. 11, 2009, the entire contents of which are incorporated herein by reference.

BACKGROUND

Data masking is a method for obscuring (masking) specific data elements within a data store. Data masking ensures that sensitive data is replaced with realistic but not real data. A goal of data masking is to obscure sensitive data, so that the sensitive data is not available outside of the authorized environment. Data masking might be done while provisioning non-production environments, so that data used to support test and development processes are not exposing sensitive data.

With data masking, data can be made to look and behave like the original data, even though it is not the original data. Thus, data masking is one solution to protect data from internal and external threats by providing realistic data without the risk of exposing sensitive data to unauthorized users. Unlike encryption, data masking may help the data maintain its usability for activities, like software development, research, testing, etc.

BRIEF DESCRIPTION OF THE DRAWINGS

FIG. 6 is a diagram of an exemplary metadata table;

FIG. 8 illustrates a table of potential masking operations that may be performed on sensitive data elements;

DETAILED DESCRIPTION OF PREFERRED EMBODIMENTS

The following detailed description refers to the accompanying drawings. The same reference numbers in different drawings may identify the same or similar elements.

Implementations, described herein, may provide data masking on data in an input file or data stored in a database table. These implementations may handle data in a number of different formats, such as fixed length, delimited and variable length, delimited. As described below, different types of sensitive data elements may be identified within the file or table, and multiple data masking operations may be performed, in parallel, on the different types of sensitive data elements. Once the data masking operations have been performed, the masked sensitive data elements may be returned to the file, thus obscuring the sensitive data elements in the file.

Assume that an input file includes three types of sensitive data elements: first name data, last name data, and social security number data. Three dynamic tables may be generated. Each of the dynamic tables may include data corresponding to one of these three types of sensitive data elements. A separate data masking operation may be performed on the sensitive data elements in each of the dynamic tables in parallel to create masked data. The masked data may be returned to the input file to create a masked output file.

Figure 1:
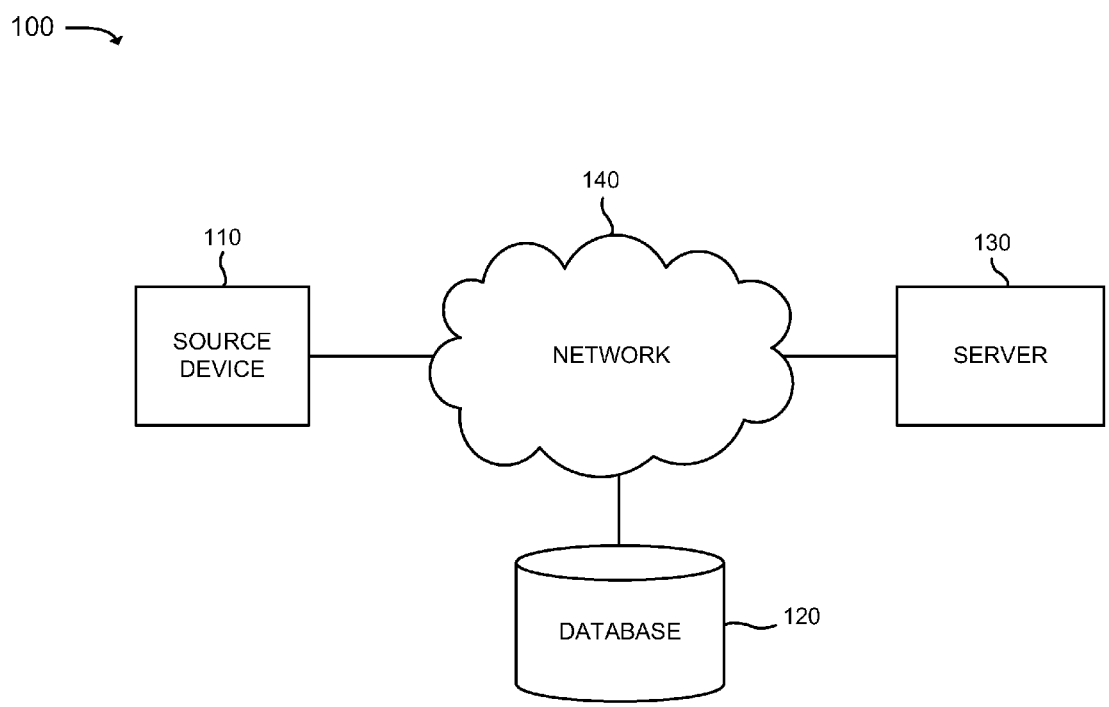
FIG. 1 is a diagram that illustrates an exemplary environment in which systems and/or methods described herein may be implemented.

FIG. 1 is a diagram that illustrates an exemplary environment 100 in which systems and/or methods described herein may be implemented. Environment 100 may include source device 110 connected to database 120 and server 130 via a network 140. While FIG. 1 shows a particular number and arrangement of devices, in practice, environment 100 may include additional, fewer, different, or differently arranged devices than are shown in FIG. 1. For example, environment 100 may not include a database 120, or may include multiple servers 130 and/or source devices 110.

Source device 110 may include a communication or computation device, such as a desktop computer, a laptop, a mobile communication device (e.g., a mobile phone or a personal digital assistant (PDA)), or another type of communication or computation device. As described herein, a user of source device 110 may push, or upload, an input file to server 130, via a secure connection through network 140, for data masking.

Database 120 may include one or more memory devices that may store tables of data. In one implementation, database 120 may store data associated with a company, such as data associated with a company's employees or customers. In another implementation, database 120 may store data associated with another organization, such as the government.

Server 130 may include a server device, such as a computer device, that performs data masking operations on input files from source device and/or data stored in database 120. In one implementation, server 130 may receive an input file from source device 110 and perform a data masking operation on certain data within the input file to generate a masked output file that server 130 may store and/or send to source device 110 or another destination. In another implementation, server 130 may access (or receive data from) database 120 to perform a data masking operation on certain data in database 120 and to generate masked data that server 130 may store and/or send to database 120 or another destination.

Network 140 may include any type of network or a combination of networks. For example, network 140 may include a local area network (LAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), or a combination of networks. In one implementation, network 140 may include devices (not shown) that may facilitate the establishment of communications between source device 110, database 120, and/or server 130.

Figure 2:
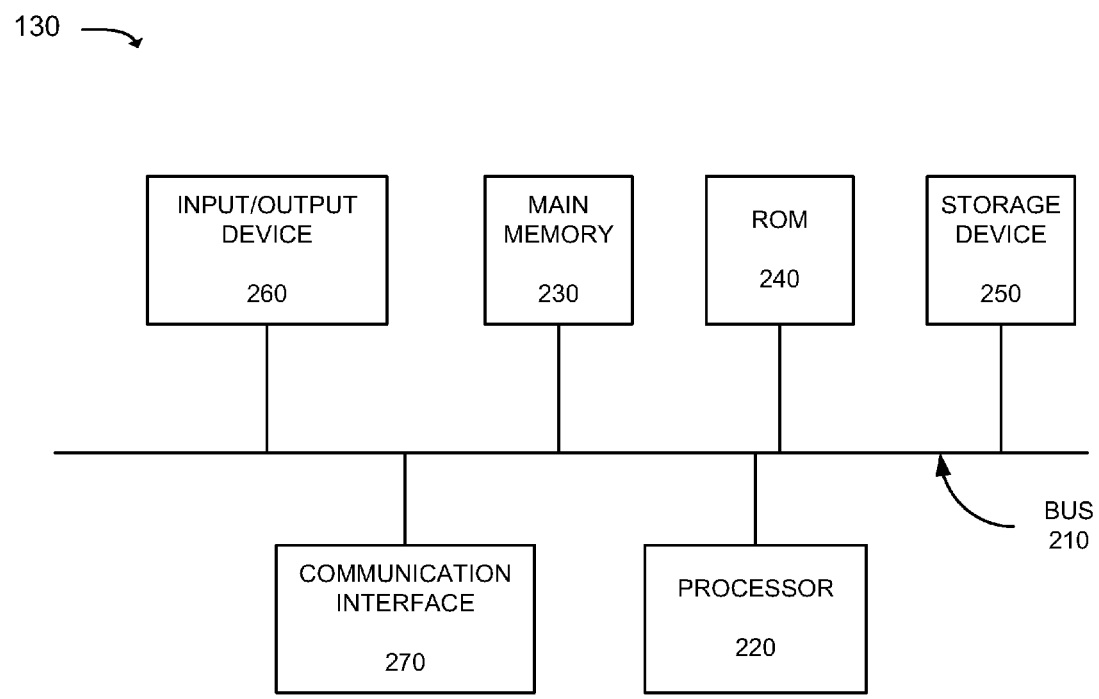
FIG. 2 is a diagram of exemplary components of the server of FIG. 1.

FIG. 2 is a diagram of exemplary components of server 130. As shown in FIG. 2, server 130 may include a bus 210, a processor 220, a main memory 230, a read only memory (ROM) 240, a storage device 250, an input/output device 260, and a communication interface 270. In another implementation, server 130 may include additional, fewer, different, and/ or differently arranged components.

Bus 210 may include a path that permits communication among the components of server 130. Processor 220 may include a processor, a microprocessor, an application specific integrated circuit (ASIC), a field programmable gate array (FPGA), or another type of processor that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic storage medium, such as a hard disk drive, or a removable memory, such as a flash memory.

Input/output device 260 may include a mechanism that permits an operator to input information to server 130, such as a control button, a keyboard, a keypad, or another type of input device; and/or a mechanism that outputs information to the operator, such as a light emitting diode, a display, or another type of output device. Communication interface 270 may include any transceiver-like mechanism that enables server 130 to communicate with other devices and/or systems. In one implementation, communication interface 270 may include one or more ports, such as an Ethernet port, a file transfer protocol (FTP) port, or a transmission control protocol (TCP) port, via which data may be received and/or transmitted.

Server 130 may perform certain operations, as described in detail below. Server 130 may perform these operations in response to processor 220 executing software instructions contained in a computer-readable medium, such as main memory 230. A computer-readable medium may be defined as a physical or logical memory device. A logical memory device may include memory space within a single, physical memory device or memory space spread across multiple, physical memory devices.

The software instructions may be read into main memory 230 from another computer-readable medium, such as storage device 250, or from another device via communication interface 270. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
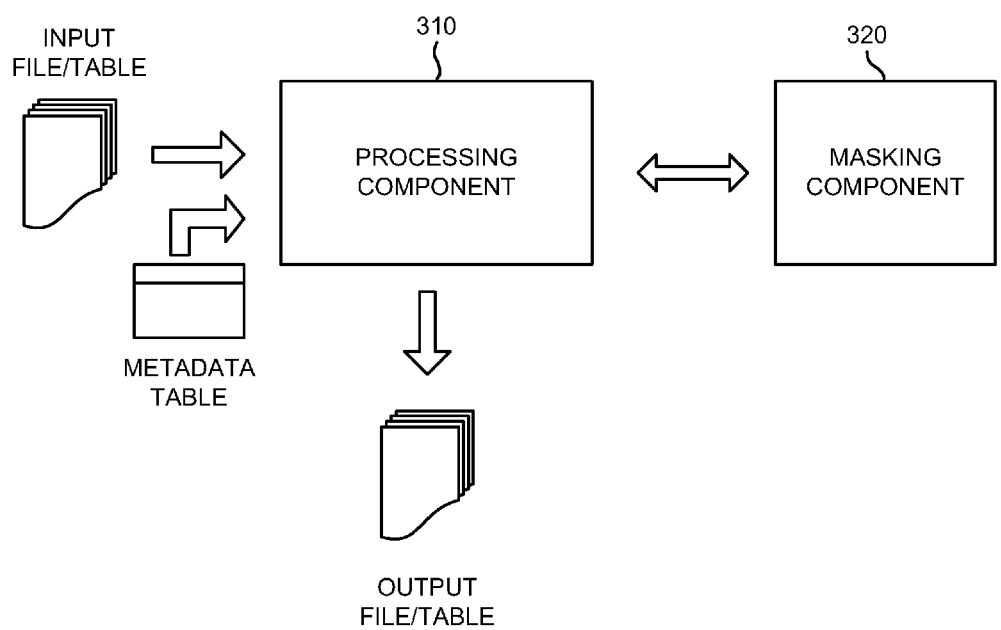
FIG. 3 is a diagram of exemplary functional components of the server of FIG. 1.

FIG. 3 is a diagram of exemplary functional components of server 130. As shown in FIG. 3, server 130 may include a processing component 310 and a masking component 320. While processing component 310 will be described as performing certain functions, one or more of these functions may be performed by masking component 320. Similarly, while masking component 320 will be described as performing certain functions, one or more of these functions may be performed by processing component 310.

Generally, processing component 310 may receive an input file or an input table (hereinafter referred to as an "input file/table") from source device 110 or database 120 (FIG. 1), and prepare sensitive data elements, from the input file/table, for processing by masking component 320. In one implementation, processing component 310 may load the data, from the input file/table, into a staging table. The data, of the input file/table, may be in one of a number of different recognizable formats, such as fixed length, delimited or variable length, delimited. Processing component 310 may recognize the format and may store each data element of a row, in the input file/table, in a different column of the staging table. Processing component 310 may associate a unique record identifier with each column and/or row of the staging table.

Processing component 310 may also receive information that identifies the location of the sensitive data elements within the input file/table. In one implementation, source device 110, or database 120, may provide not only the input file/table, but also may provide metadata that identifies the location of sensitive data elements within the input file/table. The metadata may also include information that identifies the type of sensitive data elements in the input file/table. The metadata may be stored in a metadata table.

Processing component 310 may use information in the metadata table to identify the columns, of the staging table, that contain sensitive data elements. Processing component 310 may create a separate dynamic table for each different type of sensitive data elements. For example, if the staging table includes ten columns of which column two contains first name data, column three contains last name data, and column eight contains driver's license data, processing component 310 may create three dynamic tables: one for the first name data; one for the last name data; and one for the driver's license data. Within a particular dynamic table, processing component 310 may store the corresponding sensitive data elements and the unique record identifier(s) corresponding to the column and/or rows in the staging table.

Generally, masking component 320 may perform data masking operations on the sensitive data elements in the dynamic tables. In one implementation, masking component 320 may identify the particular masking operation to perform based on the type of the sensitive data elements. For example, masking component 320 may be programmed to perform certain masking operations for certain types of sensitive data elements.

Masking component 320 may include a number of masking engines that are capable of operating in parallel. Masking component 320 may assign a masking engine to each dynamic table. The masking engines may then simultaneously perform data masking operations on the sensitive data elements in the dynamic tables to mask (e.g., obscure) the sensitive data elements. As a result of the masking operations, the dynamic tables may contain masked sensitive data elements.

Processing component 310 may replace the sensitive data elements, in the staging table, with the masked sensitive data elements using, for example, the unique record identifiers associated with the columns and/or rows. Processing component 310 may generate an output file that contains the masked sensitive data elements from the staging table. Processing component 310 may store and/or output the output file. For example, processing component 310 may store the output file in local memory or in database 120. Alternatively, or additionally, processing component 310 may send the output file to source device 110 or another destination. Processing component 310 may then delete the staging table and/or the dynamic tables.

Processing component 310 and masking component 320 may also perform operations to unmasked sensitive data elements that have been masked within a file/table. For example, processing component 310 may receive an input file/table from source device 110 or database 120 (FIG. 1), and prepare the masked sensitive data elements, from the input file/table, for processing by masking component 320. In one implementation, processing component 310 may load the data, from the input file/table, into a staging table. As described above, the data, of the input file/table, may be in one of a number of different recognizable formats, such as fixed length, delimited or variable length, delimited. Processing component 310 may recognize the format and may store each data element of a row, in the input file/table, in a different column of the staging table. Processing component 310 may associate a unique record identifier with each column and/or row of the staging table.

Processing component 310 may also receive information that identifies the location of the sensitive data elements within the input file/table. In one implementation, source device 110, or database 120, may provide not only the input file/table, but also may provide metadata that identifies the location of sensitive data elements within the input file/table. As described above, the metadata may also include information that identifies the type of sensitive data elements in the input file/table.

Processing component 310 may use information in the metadata table to identify the columns, of the staging table, that contain sensitive data elements. Processing component 310 may create a separate dynamic table for each different type of sensitive data element, as explained above.

Masking component 320 may perform data unmasking operations on the masked sensitive data elements in the dynamic tables. In one implementation, masking component 320 may identify the particular unmasking operation to perform based on the type of the sensitive data elements. For example, masking component 320 may be programmed to perform certain unmasking operations for certain types of sensitive data elements.

Masking component 320 may include a number of unmasking engines that are capable of operating in parallel. Masking component 320 may assign an unmasking engine to each dynamic table. The unmasking engines may then simultaneously perform data unmasking operations on the masked sensitive data elements in the dynamic tables to unmask the sensitive data elements (e.g., return the sensitive data elements to their original form). As a result of the unmasking operations, the dynamic tables may contain the sensitive data elements.

Processing component 310 may replace the masked sensitive data elements, in the staging table, with the sensitive data elements. Processing component 310 may generate an output file that contains the sensitive data elements from the staging table. Processing component 310 may store and/or output the output file. For example, processing component 310 may store the output file in local memory or in database 120. Alternatively, or additionally, processing component 310 may send the output file to source device 110 or another destination. Processing component 310 may then delete the staging table and/or the dynamic tables.

Figure 4:
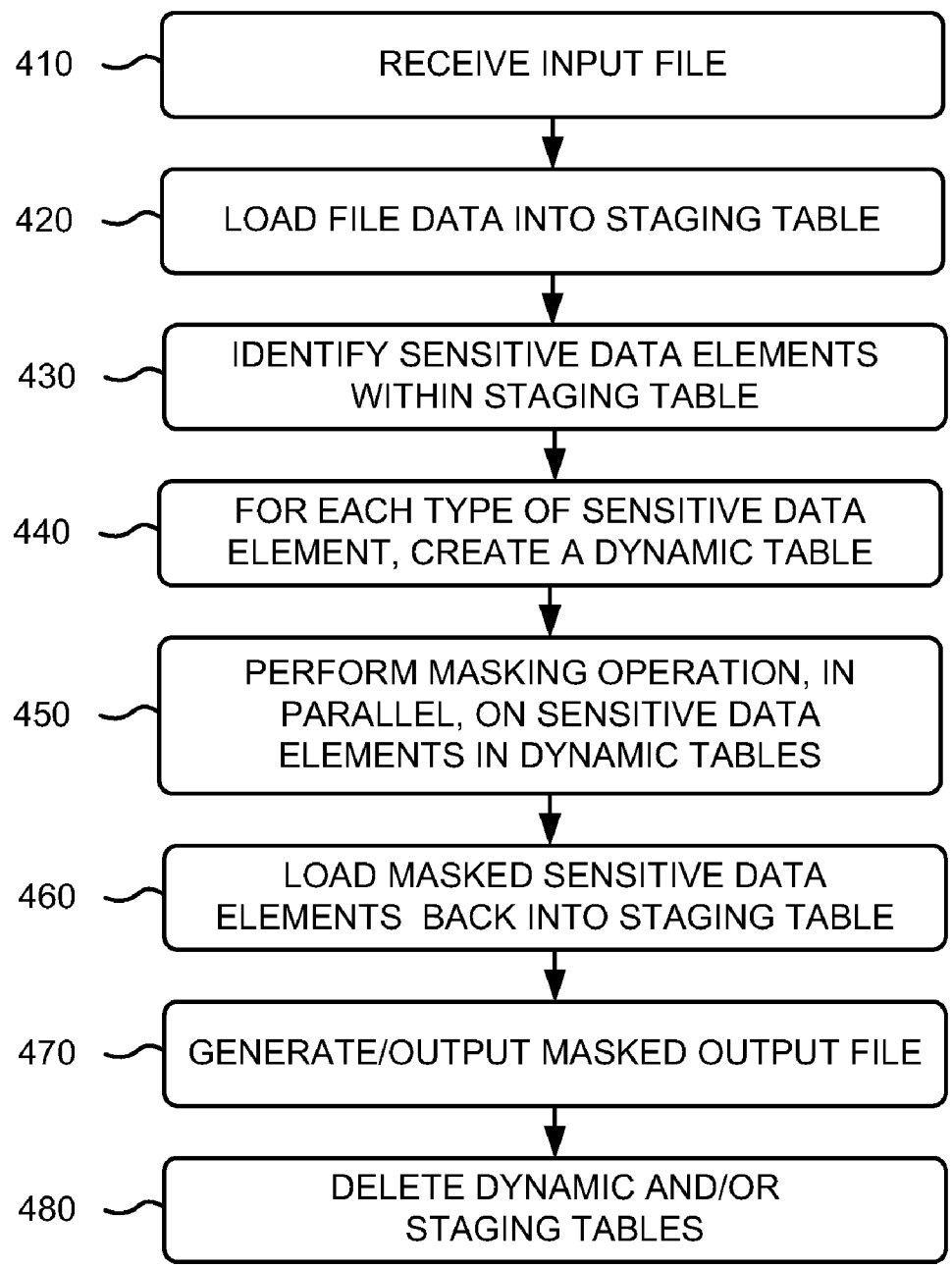
FIG. 4 is a flowchart of an exemplary process for performing a data masking operation on an input file.

FIG. 4 is a flowchart of an exemplary process for performing a data masking operation on an input file. While the process of FIG. 4 will involve data masking operations performed on data in an input file, similar operations may be performed on data in an input table. The process of FIG. 4 may be performed by one or more components of server 130. In another implementation, one or more of the blocks of FIG. 4 may be performed by one or more components associated with a device, or a group of devices, separate from server 130.

The process of FIG. 4 may include receiving an input file (block 410). In one implementation, source device 110 may push the input file to a particular port or location associated with server 130. For example, a client (e.g., a web-based client), operating on source device 110, may present a user interface (e.g., a graphical user interface) that may be used by a user of source device 110 to securely send the input file. In one implementation, the client, of source device 110, may open only a particular port on source device 110 so that the input file may be sent only to server 130. The client may also use a secure protocol, such as the secure shell file transfer protocol (SFTP), to send the input file.

The sending of the input file from source device 110 to server 130 may be scheduled. For example, source device 110 may send an input file to server 130 at particular, scheduled times. Alternatively, or additionally, the sending of the input file from source device 110 to server 130 may be automated. For example, source device 110 may send an input file to server 130 without requiring user input. In this case, the client, of source device 110, may read data from a particular location and send the data, as an input file, to server 130.

As described above, the input file may be in any recognizable format. For example, the input file may include data with row and/or column delimiters. In one implementation, the data may be formatted as fixed length, delimited data. In another implementation, the data may be formatted as variable length, delimited data. In yet another implementation, the data may be formatted in a different manner.

Data, of the input file, may be loaded into a staging table (block 420). For example, processing component 310 (FIG. 3) may load the data, from the input file, into a staging table. Processing component 310 may recognize the format of the data and may store each data element of a row, in the input file, in a different column of the staging table. Processing component 310 may associate a unique record identifier with each column and/or row of the staging table.

Figure 5:
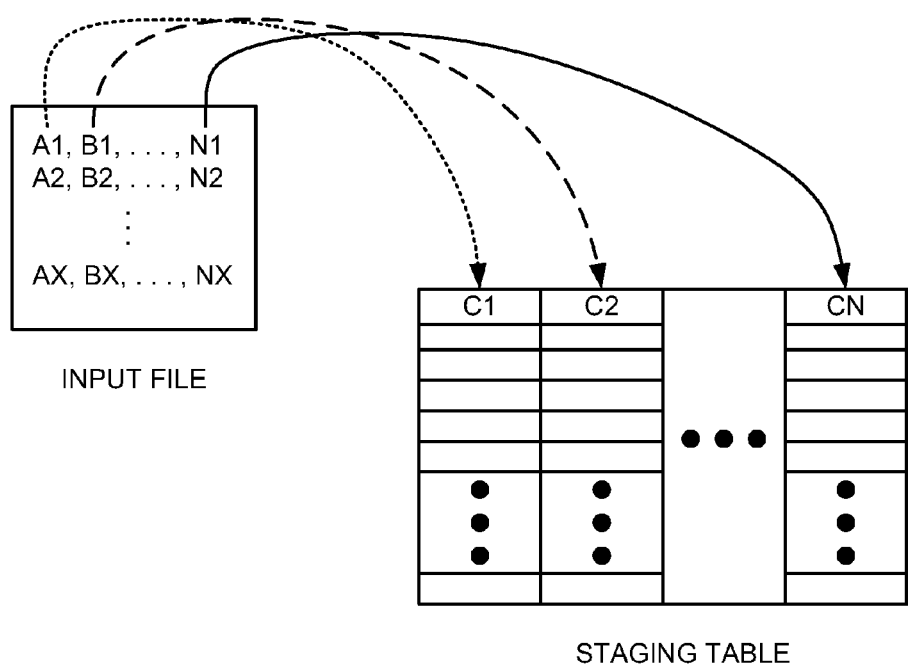
FIG. 5 is a diagram illustrating loading of an exemplary staging table.

FIG. 5 is a diagram illustrating loading of an exemplary staging table. As shown in FIG. 5, the input file may include a number of data elements, possibly delimited by row and/or column. The staging table may include a number of rows and columns. Each of the columns may include a unique record identifier (shown as C1, C2, . . . , CN in FIG. 5). Although not shown in FIG. 5, each of the rows may also, or alternatively, include a unique record identifier. Thus, a particular data element in the staging table may be identified by a unique column identifier and/or a unique row identifier. The description to follow will refer only to the unique column identifier, even though, as explained above, a unique row identifier may be used instead of, or in addition, to the unique column identifier.

Processing component 310 may store the data elements, from the input file, into the appropriate columns/rows of the staging table. For example, processing component 310 may store data element A1 in the first row of column C1; may store data element B1 in the first row of column C2; may store data element N1 in the first row of column CN; may store data element A2 in the second row of column C1; may store data element B2 in the second row of column C2; may store data element N2 in the second row of column CN; and so forth.

Returning to FIG. 4, sensitive data elements, within the staging table, may be identified (block 430). For example, processing component 310 may receive information that identifies the location of the sensitive data elements within the input file. As explained above, source device 110 may provide, to server 130, metadata that identifies the location of the sensitive data elements within the input file and that identifies the type of sensitive data elements included in the input file. The metadata, from source device 110, may be stored in a metadata table.

FIG. 6 is a diagram of an exemplary metadata table. As shown in FIG. 6, the metadata table may include information for each of the different types of sensitive data elements included in the input file. In one implementation, the metadata table may store, for a particular type of sensitive data element, a unique record identifier, a mask type, a start position, and an end position. In another implementation, the metadata table may store additional or different information.

The record identifier may correspond to the record identifier associated with a column, in the staging table, that stores the particular type of sensitive data element. The mask type may identify the type of sensitive data element. For example, the mask type might identify the sensitive data element as first name data, last name data, address data, social security number data, driver's license number data, or another type of sensitive data. The start and end positions may identify the particular location of the sensitive data element within the input file. Based on the information in the metadata table, processing component 310 may identify the columns, in the staging table, that contain sensitive data elements, and may identify the type of sensitive data element in each of the identified columns.

In one implementation, the metadata table may be provided each time that an input file/table is provided. In another implementation, the metadata table may be provided less frequently, such as once for a set of input files/tables that is provided.

Returning to FIG. 4, a dynamic table may be created for each type of sensitive data element (block 440). For example, processing component 310 may create a separate dynamic table for each different type of sensitive data element. Each of the dynamic tables may store sensitive data elements of a particular type.

Figure 7:
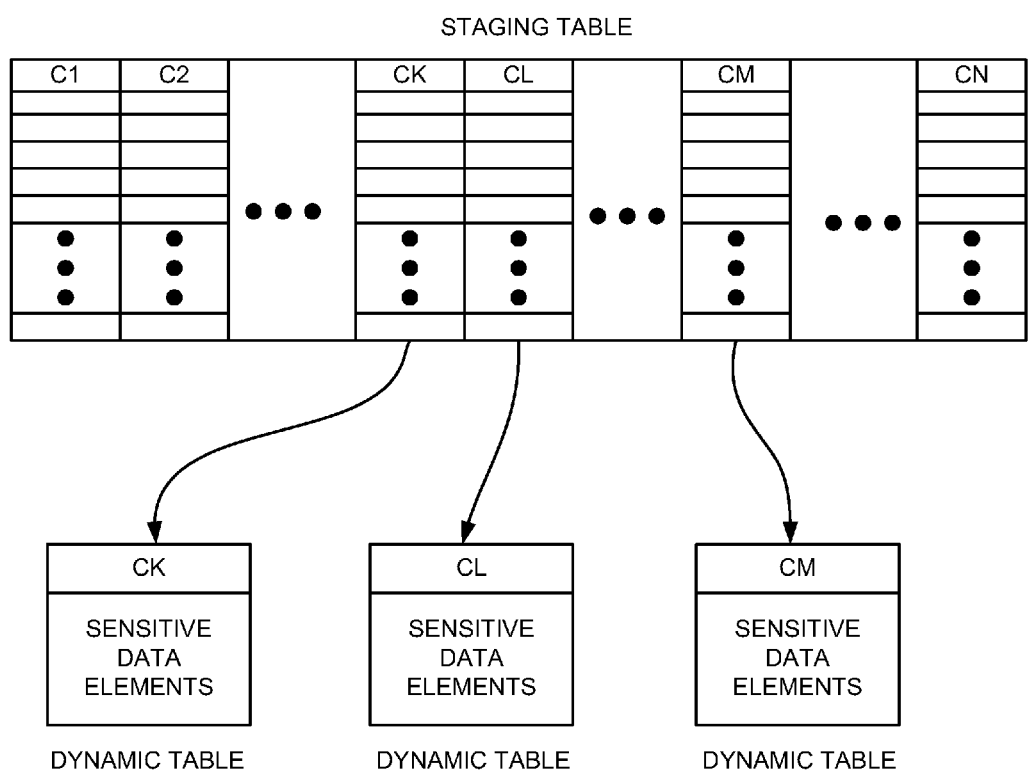
FIG. 7 is a diagram illustrating creating of exemplary dynamic tables.

FIG. 7 is a diagram illustrating creating of exemplary dynamic tables. As shown in FIG. 7, the sensitive data elements, from the staging table, may be loaded into separate dynamic tables. Each dynamic table may include the unique record identifier and the sensitive data elements from one of the columns, in the staging table, that stores the sensitive data elements.

As shown in FIG. 7, assume that columns CK, CL, and CM contain sensitive data elements. Processing component 310 may load the sensitive data elements from these columns into separate dynamic tables. For example, processing component 310 may load the sensitive data elements from column CK into the dynamic table associated with column CK; may load the sensitive data elements from column CL into the dynamic table associated with column CL; and may load the sensitive data elements from column CM into the dynamic table associated with column CM.

Returning to FIG. 4, a masking operation may be performed, in parallel, on the sensitive data elements in the dynamic tables (block 450). For example, masking component 320 may determine, for each of the dynamic tables, the appropriate masking operation to perform. Masking component 320 may make this determination based on the information in the metadata table. As described above, the metadata table may store information identifying the type of the sensitive data element and a record identifier associated with the column of the staging table and also stored in the dynamic table that stores sensitive data elements from the column of the staging table.

In one implementation, masking component 320 may perform a table lookup, or the like, to identify the appropriate masking operation for a particular type of sensitive data element. FIG. 8 illustrates a table of potential masking operations that may be performed on sensitive data elements. As shown in FIG. 8, table 800 may include a field 810 associated with different types of sensitive data elements, and may include a field 820 associated with different types of masking operations. While table 800 shows particular masking operations associated with particular types of sensitive data elements, these masking operations are simply examples. Different masking operations may be used in other implementations.

As shown in FIG. 8, one exemplary masking operation may include a translate function. A translate function may involve a pre-configured lookup table with source values and corresponding target values, which may be randomly generated. For example, to mask the last four digits of a social security number (e.g., "345-67-8901"), the translate function may perform a table lookup to identify the target value for the source value of "8901." Assume that the lookup table indicates that the target value, for the source value of "8901," is "6704." Thus, the masked output value, for the input value of "345-67-8901," is "345-67-6704."

As further shown in FIG. 8, another exemplary masking operation may include a swap function. A swap function may convert each source character value to some target character value. In one implementation, the swap function may involve a pre-configured lookup table with source character values and corresponding target character values, which may be randomly generated. For example, to mask a first name (e.g., "John"), the swap function may perform a table lookup to identify a target character value for each of the source character values of "J," "o," "h," and "n." Assume that the lookup table indicates that the target character value, for the source character value of "J," is "G;" the target character value, for the source character value of "o," is "l;" the target character value, for the source character value of "h," is "d;" and the target character value, for the source character value of "n," is "q." Thus, the masked output value, for the input value of "John," is "Gldq."

As also shown in FIG. 8, another exemplary masking operation may include blanking out certain source data. For example, if the source data includes free form comments (where a user can enter text), then the text may be blanked out with dummy text. By doing so, however, the original source data may be unrecoverable. Alternatively, the swap function may be used to permit the original source data to be recoverable.

Returning to FIG. 4, masking component 320 may dispatch the appropriate masking engine to each of the dynamic tables. The masking engines may simultaneously operate on the data in the dynamic tables. For example, a masking engine may perform the appropriate masking function on the sensitive data elements in the dynamic table to generate masked sensitive data elements.

The masked sensitive data elements may be loaded back into the staging table (block 460). For example, processing component 310 may retrieve the masked sensitive data elements from a dynamic table and store the masked sensitive data elements in the corresponding column of the staging table. Processing component 310 may identify the corresponding column using, for example, the record identifier that is stored in the dynamic table and that matches the record identifier of the corresponding column in the staging table.

A masked output file may be generated and/or output (block 470). For example, processing component 310 may remove the data from the staging table to form an output file that uses the same delimiters as the input file. The output file may correspond to the input file—except that the sensitive data elements, in the output file, may be masked. In one implementation, processing component 310 may store the output file. In another implementation, processing component 310 may output the output file to source device 110, database 120, and/or another destination.

The dynamic and/or staging tables may be deleted (block 480). For example, after returning the masked sensitive data back to the staging table, processing component 310 may delete the dynamic tables from memory. After generating the output file, processing component 310 may delete the staging table from memory.

While FIG. 4 illustrates a process for masking sensitive data elements, a similar process may be performed to unmasked masked sensitive data elements. For example, processing component 310 may receive an input file that includes masked sensitive data elements, store data, of the input file, in a staging table, and create dynamic tables corresponding to the masked sensitive data elements in the staging table. Masking component 320 may simultaneously perform data unmasking operations on the masked sensitive data elements in the dynamic tables to restore the original sensitive data elements. Processing component 310 may then store the sensitive data elements in the staging table and create, from the staging table, an output file that contains the original sensitive data elements.

Figure 9:
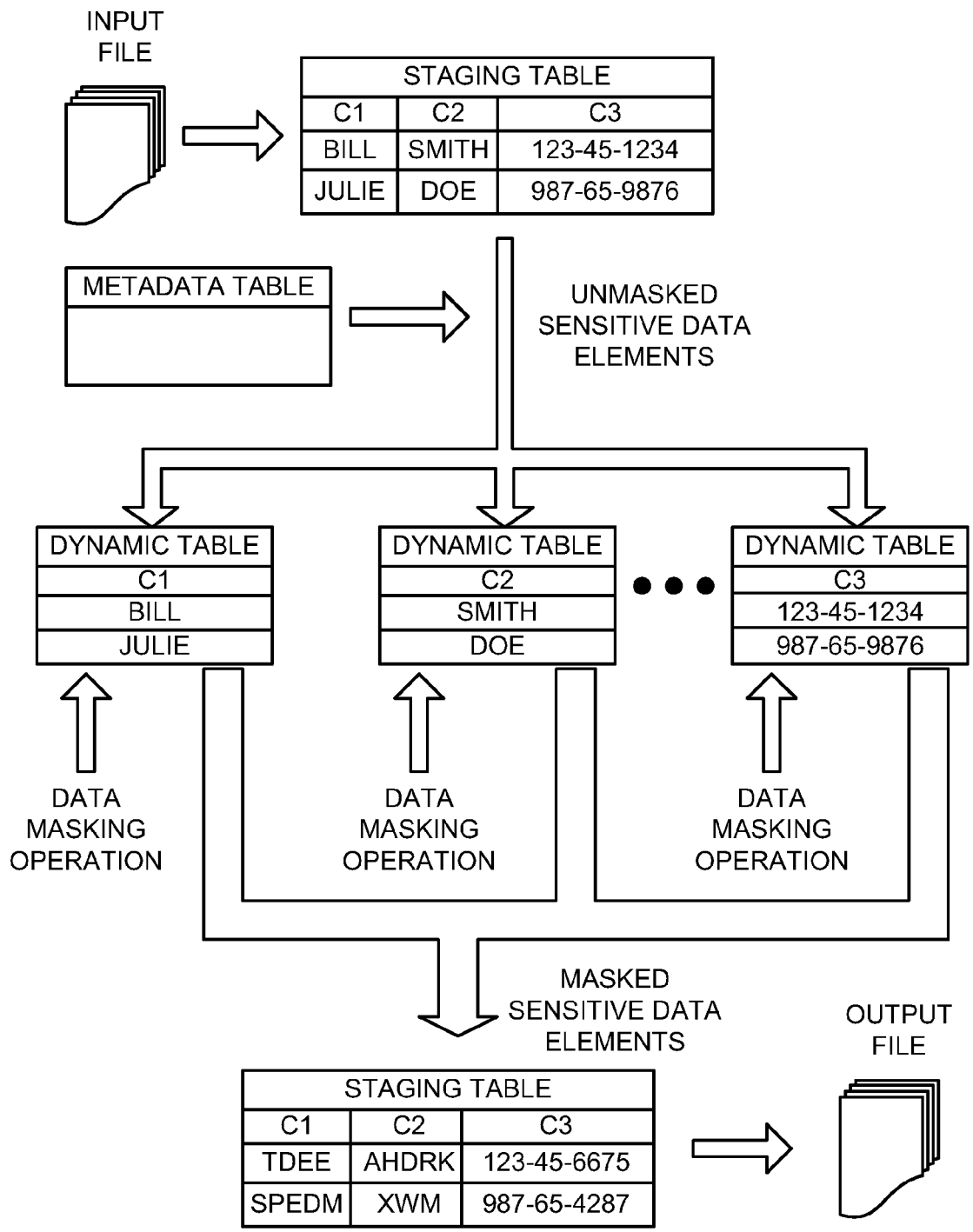
FIG. 9 is a diagram illustrating an exemplary process for performing a data masking operation.

FIG. 9 is a diagram illustrating an exemplary process for performing a data masking operation. As shown in FIG. 9, assume that an input file is received and the input file includes records associated with two individuals. Each record includes the individual's first name, last name, and social security number. The data, of the input file, may be loaded into the staging table. As shown in FIG. 9, the first name data may be stored in the column with the record identifier of C1, the last name data may be stored in the column with the record identifier of C2, and the social security number data may be stored in the column with the record identifier of C3.

The metadata table may store information that identifies the data in column C1 as first name data and that identifies the start position of the data as character 1 and the end position of the data as character 5; information that identifies the data in column C2 as last name data and that identifies the start position of the data as character 6 and the end position of the data as character 10; and information that identifies the data in column C3 as social security number data and that identifies the start position of the data as character 11 and the end position of the data as character 21.

Three dynamic tables may be created for the three columns of the staging table that include sensitive data elements. One dynamic table may correspond to column C1 in the staging table and include the sensitive data elements (i.e., first name data) from that column. Another dynamic table may correspond to column C2 in the staging table and include the sensitive data elements (i.e., last name data) from that column. Yet another dynamic table may correspond to column C3 in the staging table and include the sensitive data elements (i.e., social security number data) from that column.

Data masking operations may be performed, in parallel, on the sensitive data elements stored in the dynamic tables. For example, a swap function, a translate function, or another type of masking function may be performed on each sensitive data element in a dynamic table. As described above, the particular masking function that is performed may be preconfigured and determined based on a table lookup that depends, for example, on the type of sensitive data element involved. As a result of the data masking operations, the sensitive data elements, within the dynamic tables, may be masked (e.g., obscured).

As shown in FIG. 9, assume that the data masking operation on the first name "Bill" results in masked first name of "Tdee;" that the data masking operation on the first name "Julie" results in the masked first name of "Spedm;" that the data masking operation on the last name "Smith" results in the masked last name of "Ahdrk;" that the data masking operation on the last name "Doe" results in the masked last name of "Xwm;" that the data masking operation on the social security number "123-45-1234" results in the masked social security number of "123-45-6675;" and that the data masking operation on the social security number "987-65-9876" results in the masked social security number of "987-65-4287."

The masked sensitive data elements may be stored back in their respective places within the staging table. For example, the masked first name data may be stored in column C1; the masked last name data may be stored in column C2; and the masked social security number data may be stored in column C3. The data, from the staging table, may then be used to create an output file with masked sensitive data elements. The output file may be outputted or stored, as desired.

Figure 10:
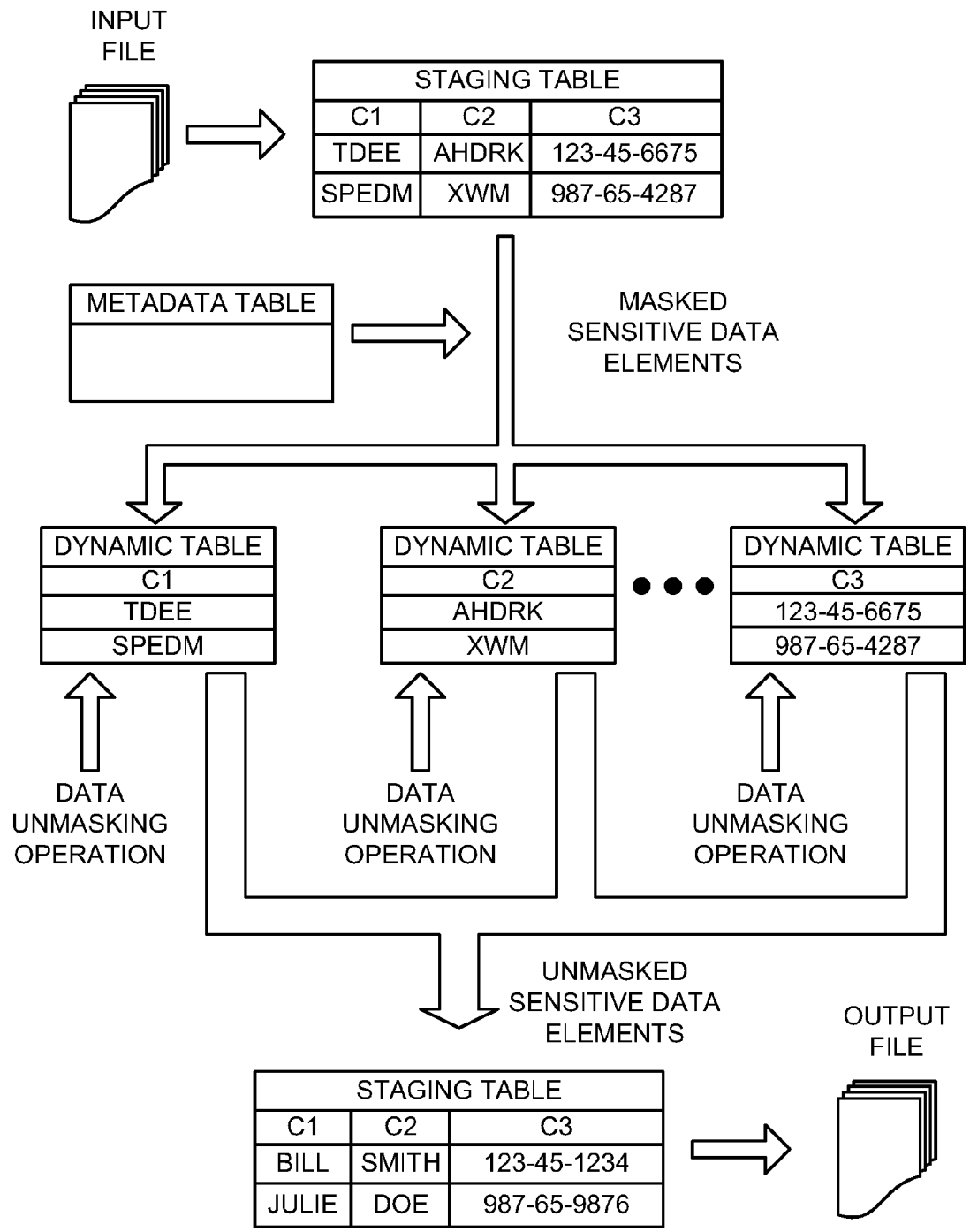
FIG. 10 is a diagram illustrating an exemplary process for performing a data unmasking operation.

FIG. 10 is a diagram illustrating an exemplary process for performing a data unmasking operation. As shown in FIG. 10, assume that an input file is received and the input file corresponds to the output file generated with regard to FIG. 9. As shown in FIG. 10, masked first name data may be stored in the column with the record identifier of C1, masked last name data may be stored in the column with the record identifier of C2, and masked social security number data may be stored in the column with the record identifier of C3.

The metadata table may store information that identifies the data in column C1 as first name data and that identifies the start position of the data as character 1 and the end position of the data as character 5; information that identifies the data in column C2 as last name data and that identifies the start position of the data as character 6 and the end position of the data as character 10; and information that identifies the data in column C3 as social security number data and that identifies the start position of the data as character 11 and the end position of the data as character 21.

Three dynamic tables may be created for the three columns of the staging table that include sensitive data elements. One dynamic table may correspond to column C1 in the staging table and include the masked sensitive data elements (i.e., masked first name data) from that column. Another dynamic table may correspond to column C2 in the staging table and include the masked sensitive data elements (i.e., masked last name data) from that column. Yet another dynamic table may correspond to column C3 in the staging table and include the masked sensitive data elements (i.e., masked social security number data) from that column.

Data unmasking operations may be performed, in parallel, on the masked sensitive data elements stored in the dynamic tables. For example, a reverse swap function, a reverse translate function, or another type of unmasking function may be performed on each masked sensitive data element in a dynamic table. As described above, the particular unmasking function that is performed may be preconfigured and determined based on a table lookup that depends, for example, on the type of sensitive data element involved. As a result of the data unmasking operations, the masked sensitive data elements, within the dynamic tables, may be unmasked (e.g., returned to the original).

As shown in FIG. 10, assume that the data unmasking operation on the masked first name "Tdee" results in the original first name of "Bill;" that the data unmasking operation on the masked first name "Spedm" results in the original first name of "Julie;" that the data unmasking operation on the masked last name "Ahdrk" results in the original last name of "Smith;" that the data unmasking operation on the masked last name "Xwm" results in the original last name of "Doe;" that the data unmasking operation on the masked social security number "123-45-6675" results in the original social security number of "123-45-1234;" and that the data unmasking operation on the masked social security number "987-65-4287" results in the original social security number of "987-65-9876."

The original sensitive data elements may be stored back in their respective places within the staging table. For example, the original first name data may be stored in column C1; the original last name data may be stored in column C2; and the original social security number data may be stored in column C3. The data, from the staging table, may then be used to create an output file with the original sensitive data elements. The output file may be outputted or stored, as desired.

Implementations, described herein, may facilitate the masking and unmasking of sensitive data. As described above, masking/unmasking operations may be performed, in parallel, on sensitive data elements in different columns of a table, which improves performance over approaches that perform masking/unmasking operations on one sensitive data element at a time. Also, an output file is generated that contains the masked sensitive data to increase security of the sensitive data over other approaches that retain the original sensitive data in the file. Further, the masking/unmasking operations are metadata-driven, thereby making the masking/unmasking process scaleable and facilitating maintenance of the masking/unmasking process.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4, the order of the blocks may be modified in other implementations. Further, non-dependent blocks may be performed in parallel.

Also, certain tables (e.g., staging, metadata, dynamic) have been described above. The term "table" is intended to refer to any data structure in memory whether implemented as what is commonly known as table or implemented as a different data structure in memory, such as a linked list.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, comprising:

receiving, by one of the one or more server devices, an input file or table that includes a plurality of data elements, where the plurality of data elements includes a plurality of sensitive data elements, where the plurality of sensitive data elements includes different types of sensitive data elements;

creating, by one of the one or more server devices, a plurality of dynamic tables, where a separate one of the plurality of dynamic tables is created for each of the different types sensitive data elements;

loading, by one of the one or more server devices, the plurality of sensitive data elements into the plurality of dynamic tables, each of the different types of sensitive data elements being loaded into a corresponding one of the plurality dynamic tables;

simultaneously performing, by one of the one or more server devices, a plurality of data masking operations on the plurality of sensitive data elements in the plurality of dynamic tables to create masked sensitive data elements;

generating, by one of the one or more server devices, an output file or table that includes the masked sensitive data elements; and outputting or storing, by one of the one or more server devices, the output file or table.

2. The method of claim 1, where the input file or table is formatted in one of a plurality of different formats; and
the method further comprises:
identifying the one of the plurality of different formats of the input file or table; and
using information regarding the one of the plurality of different formats to load the plurality of data elements, from the input file or table, into a staging table, the staging table facilitating the loading of the plurality of sensitive data elements into the plurality of dynamic tables.

3. The method of claim 2, where the staging table includes a plurality of rows and columns; and
where loading the plurality of sensitive data elements includes:
identifying one of the columns, of the staging table, that includes one of the different types of sensitive data elements, and
loading the one of the different types of sensitive data elements, from the identified one of the columns, into one of the plurality of dynamic tables.

4. The method of claim 1, further comprising:
receiving metadata that identifies a location of one of the plurality of sensitive data elements among the plurality of data elements in the input file or table, and that identifies one of the different types for the one of the plurality of sensitive data elements,
where the metadata is used to facilitate the loading of the one of the plurality of sensitive data elements into one of the plurality of dynamic tables or to select one of the plurality of data masking operations to perform on the one of the plurality of sensitive data elements.

5. The method of claim 1, further comprising:
selecting one of the plurality of data masking operations to perform on one of the different types of sensitive data elements, and
where simultaneously performing the plurality of data masking operations includes performing the selected one of the plurality of data masking operations on the one of the different types of sensitive data elements.

6. The method of claim 1, where the plurality of data masking operations includes a translate function that involves converting a source value to a target value, and a swap function that involves converting a source character value to a target character value.

7. The method of claim 1, where the output file or table includes the plurality of data elements from the input file or table, where the plurality of sensitive data elements, of the input file or table, are replaced with the masked sensitive data elements.

8. The method of claim 1, further comprising:
deleting the plurality of dynamic tables after simultaneously performing the plurality of data masking operations.

9. The method of claim 1, further comprising:
receiving the output file or table;
identifying the masked sensitive data elements in the output file or table; and
performing a data unmasking operation on the masked sensitive data elements to recover the plurality of sensitive data elements.

10. The method of claim 9, where performing the data unmasking operation includes:
simultaneously performing a plurality of data unmasking operations on the masked sensitive data elements.

11. A system, comprising:
one or more servers to:
receive an input file or table that includes a plurality of data elements, where the plurality of data elements includes a plurality of sensitive data elements, where the plurality of sensitive data elements includes different types of sensitive data elements;
identify each of the different types of sensitive data elements;
identify a subset of the plurality of sensitive data elements that corresponds to each of the different types of sensitive data elements;
simultaneously perform a plurality of data masking operations on the plurality of sensitive data elements to create masked sensitive data elements, where a separate one of the plurality of data masking operations is performed on each of the subsets of the plurality of sensitive data elements;
generate an output file or table that includes the plurality of data elements from the input file or table, where the plurality of sensitive data elements, of the input file or table, are replaced with the masked sensitive data elements; and
output or store the output file or table.

12. The system of claim 11, where the input file or table is formatted in one of a plurality of different formats; and
the one or more servers is further to:
identify the one of the plurality of different formats of the input file or table; and
use information regarding the one of the plurality of different formats to load the plurality of data elements, from the input file or table, into a staging table, where the staging table includes a plurality of rows and columns; and
where, when loading the plurality of data elements, the one or more servers is to load each of the plurality of data elements into a different combination of one of the rows and one of the columns.

13. The system of claim 11, where the one or more servers is further to:
load each of the subsets of the plurality of sensitive data elements into a corresponding one of a plurality of dynamic tables, where each of the plurality of data masking operations is performed with regard to a corresponding one of the plurality of dynamic tables.

14. The system of claim 11, where the one or more servers is further to:
receive metadata that identifies a location of one of the plurality of sensitive data elements among the plurality of data elements in the input file or table, and that identifies one of the different types for the one of the plurality of sensitive data elements, and
where the metadata is used to facilitate the identification of one of the subsets of the plurality of sensitive data elements or to select one of the plurality of data masking operations to perform on the one of the subsets of the plurality of sensitive data elements.

15. The system of claim 11, where the one or more servers is further to:
select one of the plurality of data masking operations to perform on one of the subsets of the plurality of sensitive data elements, and
where simultaneously performing the plurality of data masking operations includes performing the selected one of the plurality of data masking operations on the one of the subsets of the plurality of sensitive data elements.

16. The system of claim 11, where the plurality of data masking operations includes a translate function that involves converting a source value to a target value, and a swap function that involves converting a source character value to a target character value.

17. The system of claim 11, where the one or more servers is further to:
receive the output file or table;
identify the masked sensitive data elements in the output file or table; and
perform a data unmasking operation on the masked sensitive data elements to recover the plurality of sensitive data elements.

18. The system of claim 17, where, when performing the data unmasking operation, the one or more servers is to simultaneously perform a plurality of data unmasking operations on the masked sensitive data elements.

19. One or more servers, comprising:
means for receiving an input file or table that includes a plurality of data elements, where the plurality of data elements includes a plurality of sensitive data elements, where the plurality of sensitive data elements includes different types of sensitive data elements;
means for loading the plurality of data elements into a staging table that includes a plurality of rows and a plurality of columns, where each of the different types of sensitive data elements is loaded into a different one of the plurality of columns;
means for creating a plurality of dynamic tables, where a separate one of the plurality of dynamic tables is created for each of the different types sensitive data elements and corresponds to one of the plurality of columns in the staging table;
means for loading the plurality of sensitive data elements, from two or more of the plurality of columns of the staging table, into the plurality of dynamic tables;
means for performing, in parallel, a plurality of data masking operations on the plurality of sensitive data elements in the plurality of dynamic tables to create masked sensitive data elements;

means for loading the masked sensitive data elements back into the corresponding columns in the staging table;

means for generating an output file or table from the data elements in the staging table after the masked sensitive data elements have been loaded back into the corresponding columns in the staging table; and means for outputting or storing the output file or table.

20. The one or more servers of claim 19, further comprising:

means for selecting one of the plurality of data masking operations to perform on one of the different types of sensitive data elements, and where the means for performing, in parallel, the plurality of data masking operations includes means for performing the selected one of the plurality of data masking operations on the one of the different types of sensitive data elements.

* * * * *